United States Patent [19]
Machida

[11] Patent Number: 5,821,480
[45] Date of Patent: Oct. 13, 1998

[54] SWITCH APPARATUS

[75] Inventor: Katsuki Machida, Tokyo, Japan

[73] Assignee: Asahi Kogaku Kogyo Kabushiki Kaisha, Tokyo, Japan

[21] Appl. No.: 703,182

[22] Filed: Aug. 26, 1996

[30] Foreign Application Priority Data

Sep. 1, 1995 [JP] Japan ................................. 7-225126

[51] Int. Cl.$^6$ ............................ H01H 9/00; H01H 19/58; H01H 9/26
[52] U.S. Cl. ........................... 200/4; 200/14; 200/11 DA; 200/5 R
[58] Field of Search ................................. 200/4, 5 A, 5 R, 200/6 R, 11 R, 18, 11 DA, 314, 316, 329, 14

[56] References Cited

U.S. PATENT DOCUMENTS

| | | | |
|---|---|---|---|
| 4,329,039 | 5/1982 | Kaneko | 354/266 |
| 4,724,286 | 2/1988 | Cummins | 200/4 |
| 4,728,755 | 3/1988 | Fowler et al. | 200/11 DA |
| 5,051,764 | 9/1991 | Nomura | 354/195.1 |
| 5,436,413 | 7/1995 | Katakami | 200/14 |
| 5,491,311 | 2/1996 | Muscat et al. | 200/4 |
| 5,546,067 | 8/1996 | Schmidt et al. | 338/172 |

FOREIGN PATENT DOCUMENTS

| | | |
|---|---|---|
| 523242 | 7/1940 | United Kingdom . |
| 660673 | 11/1951 | United Kingdom . |
| 743838 | 1/1956 | United Kingdom . |
| 770328 | 3/1957 | United Kingdom . |
| 977130 | 12/1964 | United Kingdom . |
| 1362986 | 8/1974 | United Kingdom . |
| 2259609 | 3/1993 | United Kingdom . |

OTHER PUBLICATIONS

Copy of United Kingdom Search Report.

*Primary Examiner*—Cassandra C. Spyrou
*Assistant Examiner*—Michael J. Hayes
*Attorney, Agent, or Firm*—Greenblum & Bernstein P.L.C.

[57] ABSTRACT

A switch apparatus includes a push button switch having a shaft portion and a rotary switch having a rotation operating portion which rotates about the shaft portion of the push button switch. The switch also includes a push button switch contact member and a rotary switch contact member. The push button switch contact member is actuated in accordance with a movement of the shaft portion of the push button switch. The rotary switch contact member is actuated in accordance with rotation of the rotation operating portion. The push button contact member and the rotary switch contact member are spaced from one another along the shaft portion of the push button switch.

5 Claims, 3 Drawing Sheets

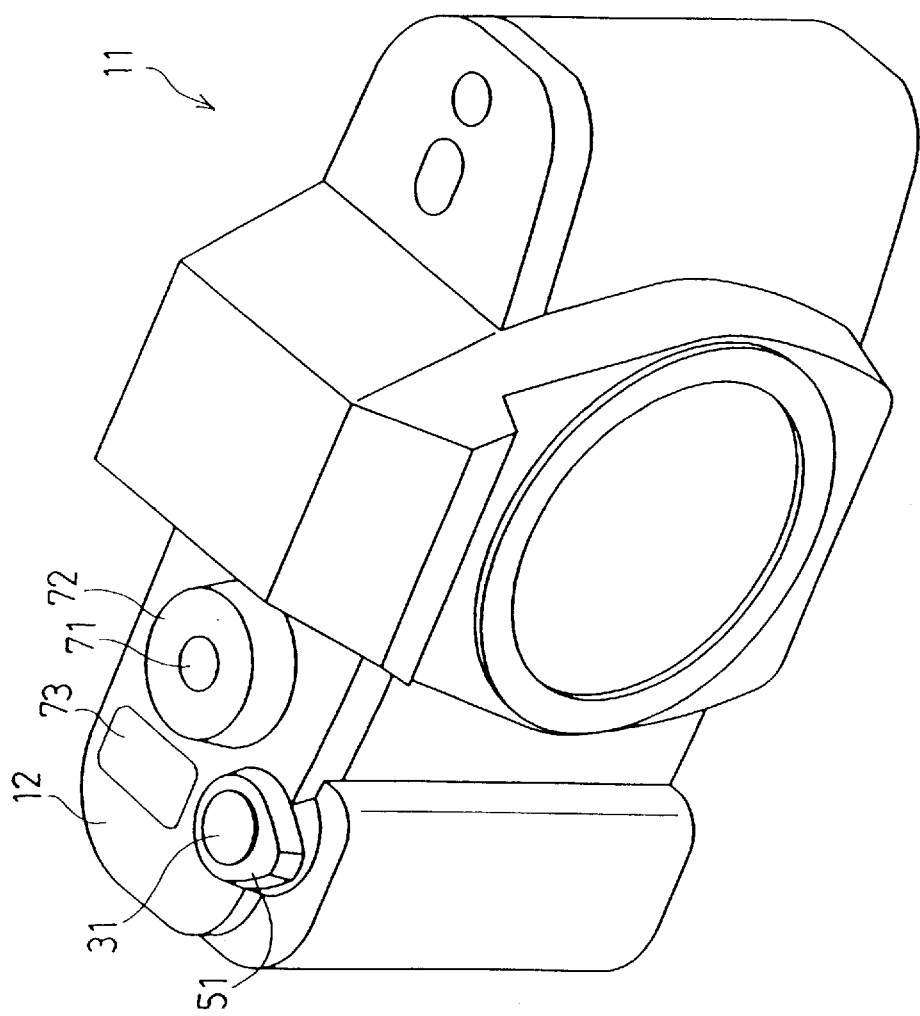

SWITCH APPARATUS

BACKGROUND OF THE INVENTION

1. Field of the Invention

The present invention relates to a switch apparatus having a push button switch and a rotary switch coaxial to the push button switch.

2. Description of the Related Art

In a known camera, a push button switch is provided on a shaft of a rotation type switch (rotary switch). The push button switch includes a stationary contact member provided on a printed circuit board, and a movable contact member provided above and spaced from the stationary contact member by a predetermined distance. The movable contact member is moved by the shaft of the push button switch to come into contact with the stationary contact member to turn the push button switch ON or OFF.

The rotary switch includes a plurality of conductor pattern portions provided on the printed circuit board, around the stationary contact member, to form a stationary contact pattern. A brush which is secured to the rotary switch so as to selectively come into sliding contact with the conductor pattern portions to thereby establish an electrical connection with a predetermined conductor pattern portion, or ground a predetermined conductor pattern portion, when a switching operation is carried out or the rotary switch is turned ON or OFF. Namely, the conductor pattern portions of the rotary switch and the stationary contact member of the push button switch are provided on the same printed circuit board. It is thus necessary to provide a large space for the switches on the printed circuit board.

Moreover, a main switch of a conventional camera, particularly a single lens reflex camera, is provided on an upper surface (upper decorative plate) of the camera body, independent of other switches. Consequently, it is necessary to provide sufficient space on the upper surface of the camera body to mount the main switch and accommodate the printed circuit board.

SUMMARY OF THE INVENTION

It is an object of the present invention to reduce the surface area or space necessary to mount or provide the push button switch and the rotary switch coaxial thereto.

To achieve the object mentioned above, according to the present invention, there is provided a switch apparatus including a push button switch having a shaft portion and a rotary switch having a rotation operating portion which rotates about the shaft portion of the push button switch. The switch apparatus includes a push button switch contact member and a rotary switch contact member. The push button switch contact member is actuated in accordance with a movement of the shaft portion of the push button switch. The rotary switch contact member is actuated in accordance with a rotation of the rotation operating portion. The push button contact member and the rotary switch contact member are spaced from one another along the shaft portion of the push button switch.

With this arrangement, since the push button switch and the rotary switch are aligned along the same axis and the contact members of the push button switch and the rotary switch are superimposed along the axis of the shaft portion of the push button switch, the mounting surface area necessary for the push button switch and the rotary switch is reduced. Consequently, it is possible to provide a larger liquid crystal display panel on the upper surface of the camera body.

The push button switch contact member can be provided on a first switch portion of a main board (flexible printed circuit board), and the rotary switch contact member can be provided on a second switch portion which is formed by bending the main board to extend in a space defined between the push button switch contact member and the rotation operating portion.

Preferably, the shaft portion of the push button switch extends through a hole formed in the second switch portion, so that a lower end of the shaft portion abuts against the push button switch contact member.

The rotary switch contact member can include a conductive code plate formed on the second switch portion around the shaft portion, and a brush which is mounted to the rotation operating portion to come into sliding contact with the conductive code plate.

In an application of the invention to a camera, the push button switch is a release switch having two switch elements. Each of the switch elements is respectively turned ON when the release switch is half-depressed and fully depressed. The rotary switch can be a main switch which is actuated to turn a power source of the camera ON and OFF. With this arrangement the camera body can be miniaturized owing to a reduction in the surface area or space necessary to mount or accommodate the switches.

The present disclosure relates to subject matter contained in Japanese Patent Application No. 07-225126 (filed on Sep. 1, 1995) which is expressly incorporated herein by reference in its entirety.

BRIEF DESCRIPTION OF THE DRAWINGS

The present invention will be described below in detail with reference to the accompanying drawings, in which similar elements are indicated by similar reference numerals, and wherein:

FIG. 4 is a perspective view of a single lens reflex camera.

DESCRIPTION OF THE PREFERRED EMBODIMENT

FIG. 4 shows a perspective view of a single lens reflex camera having a release button in the form of a push button switch and a main switch in the form of a rotary switch.

A camera body 11 is provided on an upper surface (upper decorative plate) 12 thereof with a release button 31 and a main switch lever 51.

The release button 31 is in the form of a push button switch. As is well known, the release button 31 constitutes an operating portion for a push button contact member. Namely, when the release button 31 is depressed by a half-step, a first switch (photometering switch) is turned ON; when the release button 31 is fully depressed, a second switch (release switch) is turned ON. Note that when the photometering switch is turned ON, a photometering operation and an automatic focusing operation, etc., are carried out; when the release switch is turned ON, a mirror, a diaphragm and a shutter are driven to perform an exposure operation.

Figure 2:
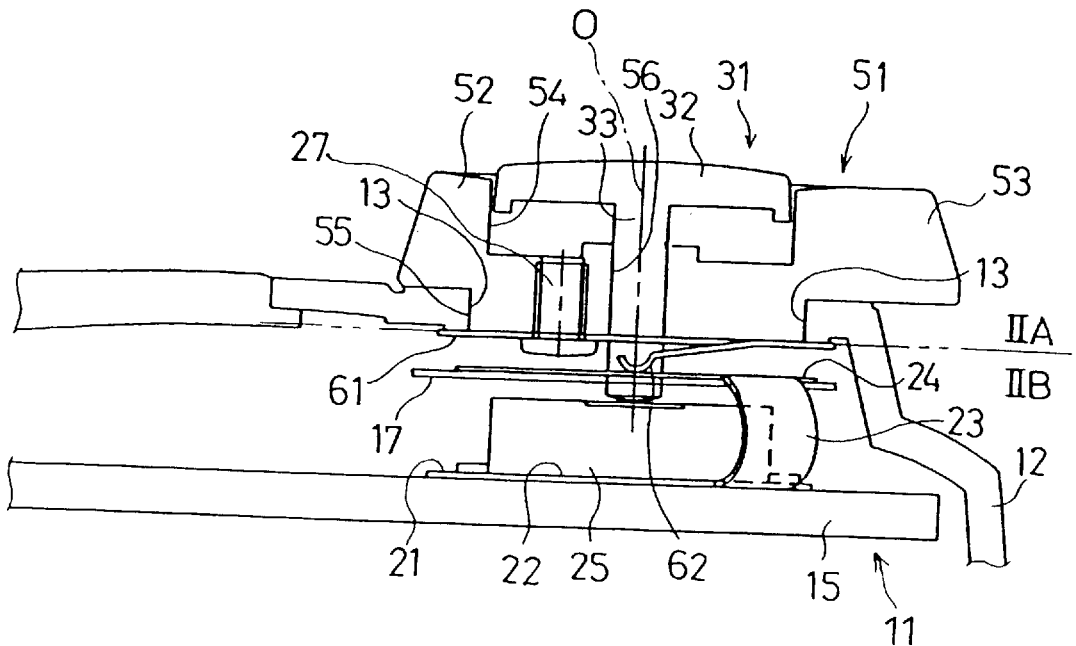
FIG. 2 shows sectional views taken along the lines IIA—IIA and IIB—IIB of FIG. 1.

The main switch lever 51 is a rotary switch. The main switch lever 51 constitutes an operating portion of the main switch to turn the power source of the camera ON or OFF. The main switch lever 51 is provided coaxial to a shaft 33 of the release button 31, as shown in FIG. 2.

A dial 72 is provided on the upper decorative plate 12 of the camera body 11. The dial 72 constitutes a dial (rotary) switch which is actuated to vary a shutter speed, etc. Numeral 71 designates an unlocking button which is actuated to permit a rotation of the dial 72. Numeral 73 designates a liquid crystal display (LCD) panel for indicating photographing information, such as the number of frames that have been exposed or the shutter speed, etc.

Figure 3:
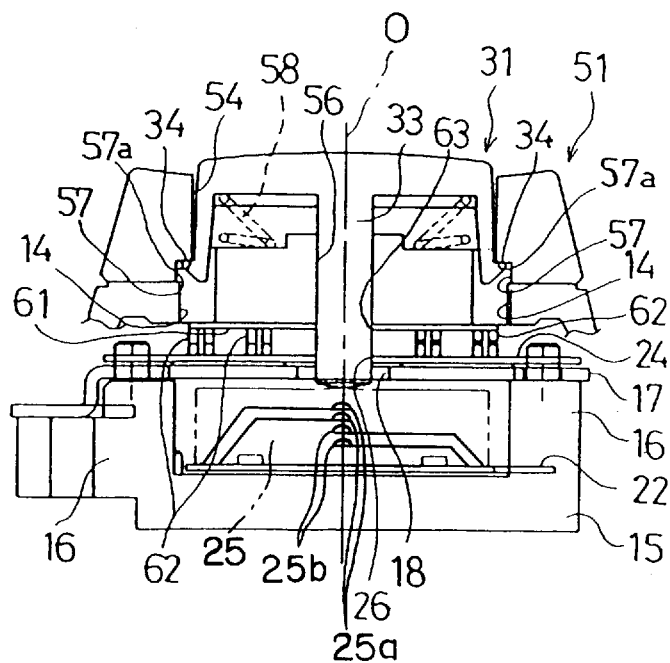
FIG. 3 is a sectional view taken along the line III—III of FIG. 1.

The structure of the release switch and the main switch, which are respectively actuated by the release button 31 and the main switch lever 51, will now be discussed with reference to FIGS. 1 through 3.

Figure 1:
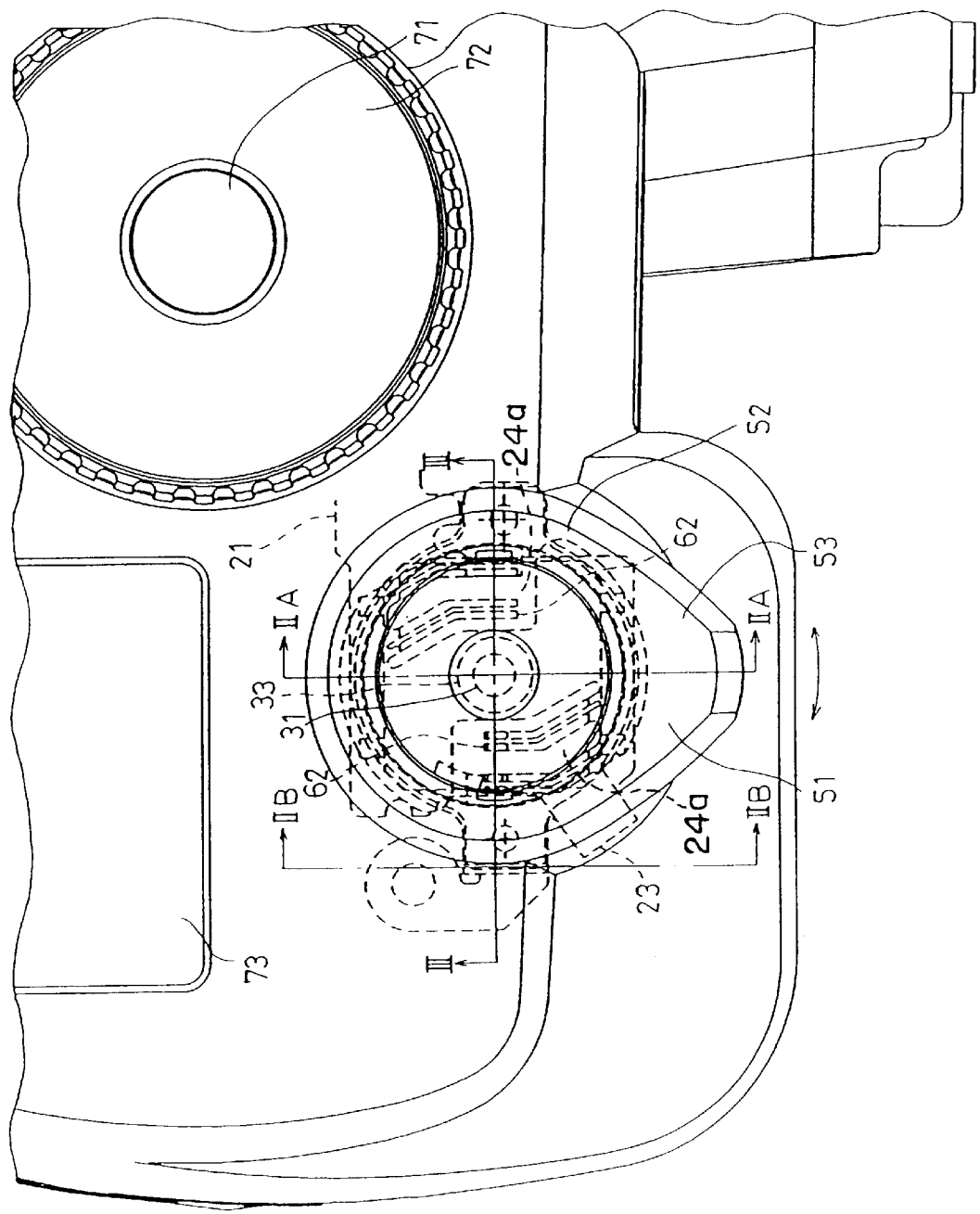
FIG. 1 is a plan view of a main part of a first embodiment applied to a release button and a main switch lever for a single lens reflex camera.

FIG. 1 is a plan view of the release button 31, the main switch lever 51, and the surroundings thereof. FIG. 2 shows sectional views taken along the lines IIA—IIA and IIB—IIB of FIG. 1. FIG. 3 shows a sectional view taken along the line III—III of FIG. 1. Note that in FIG. 2, the upper and lower halves, with respect to the broken line, are sectional views respectively taken along the lines IIA—IIA and IIB—IIB of FIG. 1.

The release button 31 is provided with an operating portion 32 and the shaft 33. The operating portion 32 has a smoothly curved upper surface. The shaft 33 extends into the camera body 11 from a central portion of an inner periphery of the operating portion 32.

The main switch lever 51 includes a rotation operating portion 52 having an operation lever 53, a recess 54, and a cylindrical shaft portion 55. The recess 54 is formed at a center of the rotation operating portion 52 to receive the operating portion 32 of the release button 31, which is slidably fitted in the recess 54. The cylindrical shaft portion 55 extends from a lower portion of the rotation operating portion 52 into the camera body 11. The cylindrical shaft portion 55 is provided with an axial through hole 56 through which the shaft portion 33 of the release button 31 is slidably inserted.

The cylindrical shaft portion 55 is rotatably inserted in a bearing hole 13 formed in the upper decorative plate 12. A brush plate 61, having conductor brushes 62, is secured to the front end (the bottom end as viewed in FIG. 2) of the cylindrical shaft portion 55 by a screw 27; this to prevents the cylindrical shaft portion 55 from coming out of the bearing hole 13. The conductor brushes 62 function as a movable contact member. The brush plate 61 is made of an elastic or flexible conductor plate. The conductor brushes 62 are formed by cutting and bending the brush plate 61 and are arranged symmetrically with respect to an axis "O" of the cylindrical shaft portion 55, as shown in FIG. 3. The brush plate 61 is provided with a hole 63 aligned with the axial hole 56, so that the shaft portion 33 extends through the hole 63.

A click-stop mechanism (not shown) is applied to the main switch lever 51 to click-stop the main switch lever 51 at predetermined ON and OFF positions.

A pair of pawls 34, extending in the direction of the shaft portion 33, are symmetrically provided on the peripheral edge of the operating portion 32 with respect to the shaft portion 33. The pawls 34 are slidably fitted in grooves 57, formed on the end of the recess 54 of the operating portion 52 located adjacent to the camera body 11, and grooves 14, formed in the bearing hole 13 and connected to the grooves 57. A spring 58 is provided between the operating portion 32 and the recess 54 to continuously bias the operating portion 32 in an outward direction (upwards as viewed in FIG. 3). The pawls 34 engage with upper ends 57a of the grooves 57 to prevent further upward (or outward) movement of the operating portion 32. The release button 31 is held such that the pawls 34 always engage with the upper ends 57a of the grooves 57 due to the spring force of the spring 58.

A substrate (motherboard) 15 is secured in the camera body 11. The substrate 15 is located beneath the release button 31 and the main switch lever 51. A first switch portion 22 of a flexible printed circuit board (main board) 21, on which electronic elements of a controller or a circuitry of the camera are mounted, is connected to the substrate 15. The first switch portion 22 is provided with a release switch contact member (push button switch contact member) 25. A lower end of the shaft portion 33 abuts against the upper surface of the release switch contact member 25. A support plate 17, which is supported by the substrate 15 through a plurality of posts 16, is provided above the release switch contact member 25. The support plate 17 is provided with an axial hole 18 through which the shaft portion 33 extends.

The release switch contact member 25 is provided with two pairs of spaced contact elements 25a and 25b which are held by elastic members. When the release button 31 is depressed by a half-step, one of the pairs of contact elements 25a (photometering switch) is turned ON, and when the release button 31 is fully depressed, the other of the pair of contact elements (release switch) is turned ON while the first of the pair of contact elements remains ON.

The main board 21 is provided with a second switch portion 24 which extends from the first switch portion 22. A hole 26 is provided in the second switch portion 24 through which the shaft portion 33 extends. The second switch portion 24 is bent at a connecting portion (bent portion) 23, and extends in a space defined between the support plate 17 and the brush plate 61, and is secured to the upper surface of the support plate 17. The second switch portion 24 is provided on an upper surface thereof with a conductor plate have 24a having a conductor pattern (not shown) with which the conductor brushes 62 come into sliding contact. The conductor brushes 62 rotate together with the main switch lever 51, so that the portion of the conductor pattern which is to be brought into sliding contact with the conductor brushes 62 varies in accordance with the angular position of the main switch lever 51. Namely, the conductor brushes 62 and the conductor pattern constitute (1) a rotary switch contact member, and (2) a main switch (selection switch) which is actuated to turn the power source ON and OFF in accordance with the angular position of the main switch lever 51.

As can be understood from the foregoing, since the release button 31 and the main switch lever 51 are aligned along the same axis and the contact elements of the release button 31 and the main switch lever 51 are superimposed along the axis of the release button 31, the mounting surface area for the release button 31 and the main switch lever 51 is reduced. Consequently, it is possible to provide a larger liquid crystal display panel on the upper surface of the camera body. Moreover, the surface area necessary to mount the conductor brushes 62 associated with the movement of the main switch lever 51 and the projection area of the second switch portion 24 is reduced.

Furthermore, if the thickness of the main switch lever 51 is increased to facilitate the operation thereof, the height of the position at which the release button 31 is located is increased, and hence, the distance between the operating portion 32 and the release switch member 25 is increased. Consequently, it is possible to arrange the second switch portion 24 and the conductor brushes 62, etc., in the space between the operating portion 32 and the release switch member 25, thus resulting in a compact camera body 11.

Although the second switch portion 24 of the flexible printed circuit board 21 is bent at the connecting portion 23, it is possible to twist the connecting portion 23 by 180°. The conductor code portion of the second switch portion 24 is thus formed in the same plane as the first switch portion 22 on which the release switch member 25 is provided.

Although the above-mentioned embodiment is applied to the main switch and the release switch, the present invention can be equally applied to the unlocking button 71 and the dial (rotary) switch 72 to set the shutter speed, etc.

As may be understood from the above description, in a switch mechanism having a push button switch with a shaft portion and a rotary switch having a rotation operating portion which rotates about the shaft portion of the push button switch, since the push button contact member, which is actuated in accordance with the movement of the shaft portion of the push button switch, and the rotary switch contact member, which is actuated in accordance with the rotation of the rotation operating portion, are provided along the shaft portion of the push button switch and are spaced from one another, the surface area or space necessary to mount or accommodate the push button switch and the rotary switch is reduced.

Moreover, if the push button switch is used as a release switch and the rotary switch is used as a main switch for a camera, the camera body can be miniaturized owing to a reduction in the surface area or space necessary to mount or accommodate the switches.

What is claimed is:

1. A switch apparatus including a push button switch having a shaft portion and a rotary switch having a rotation operating portion which rotates about said shaft portion of said push button switch, comprising:

a push button switch contact member actuated in accordance with movement of said shaft portion of said push button switch; and a rotary switch contact member actuated in accordance with rotation of said rotation operating portion, wherein said push button switch contact member is provided on a first switch portion of a flexible printed circuit board, and said rotary switch contact member is provided on a second switch portion of said flexible printed circuit board formed by bending said flexible printed circuit board to extend in a space defined between said push button switch contact member and said rotation operating portion.

wherein said push button switch contact member and said rotary switch contact member are spaced from one another along said shaft portion of said push button switch.

2. The switch apparatus according to claim 1, wherein said shaft portion of said push button switch extends through a hole formed in said second switch portion, so that a lower end of said shaft portion abuts against said push button switch contact member.

3. The switch apparatus according to claim 1, wherein said rotary switch contact member comprises a conductive code plate formed on said second switch portion around said shaft portion, and a brush mounted on said rotation operating portion to come into sliding contact with said conductive code plate.

4. The switch apparatus according to claim 1, applied to a camera, wherein said push button switch is a release switch having two switch elements, and each of said two switch elements is respectively turned ON when said release switch is half-depressed and fully depressed.

5. The switch apparatus according to claim 4, wherein said rotary switch is a main switch which is actuated to turn said camera ON and OFF.

* * * * *